F. S. EKLIFF.
ANTIRATTLING DEVICE.
APPLICATION FILED MAY 28, 1917.

1,265,311. Patented May 7, 1918.

Witness
Charles Balg
Karl H. Butler

Inventor
Frederick S. Ekliff
By [signature]
Attorneys

UNITED STATES PATENT OFFICE.

FREDERICK S. EKLIFF, OF DETROIT, MICHIGAN.

ANTIRATTLING DEVICE.

1,265,311.  Specification of Letters Patent.  Patented May 7, 1918.

Application filed May 28, 1917. Serial No. 171,440.

*To all whom it may concern:*

Be it known that I, FREDERICK S. EKLIFF, a citizen of the United States of America, residing at Detroit, in the county of Wayne and State of Michigan, have invented certain new and useful Improvements in Antirattling Devices, of which the following is a specification, reference being had therein to the accompanying drawings.

This invention relates to an anti-rattling device for automobiles and has special reference to a device designed and constructed for the well known type of "Ford" automobile.

The object of my invention is to provide a simple, durable and inexpensive device that can be easily and quickly installed in connection with the radius rods of a front axle and the connecting rods of the steering mechanism, so as to prevent the steering connecting rods and their appurtenant parts from rattling or becoming unnecessarily loose during the operation of an automobile.

Figure 1:
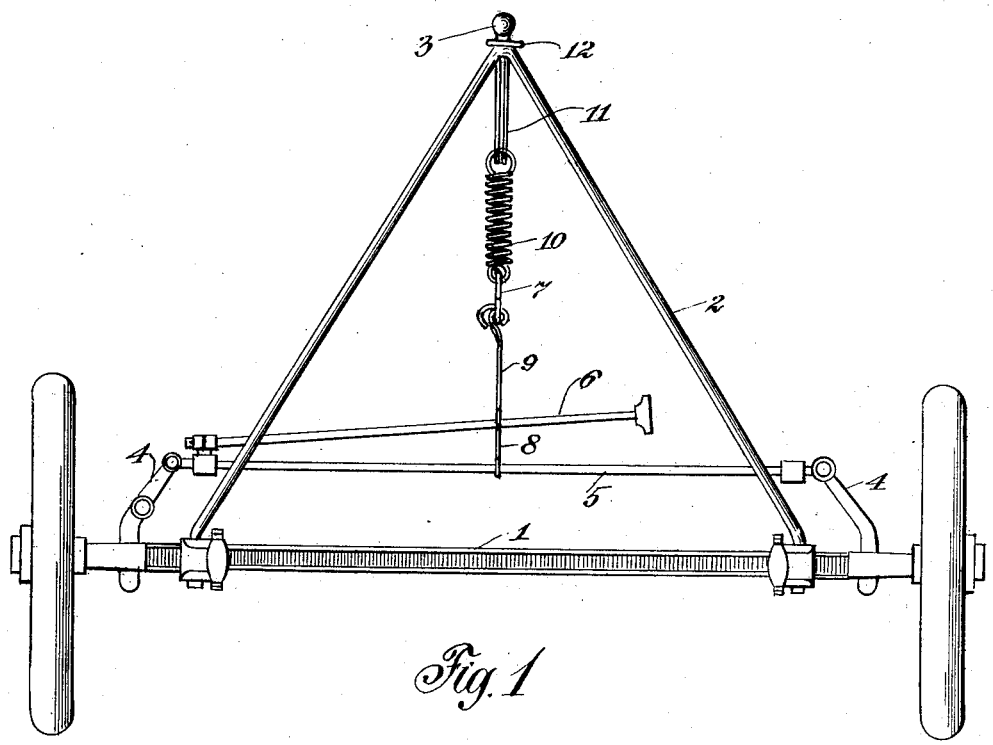
Figure 2:
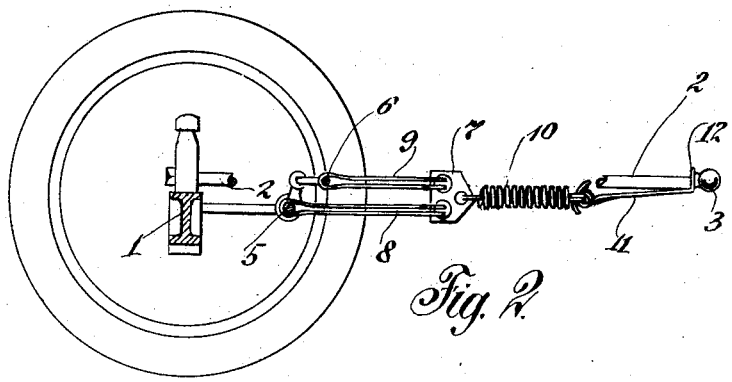

I attain the above object by a mechanical construction that will be hereinafter specifically described and then claimed, and reference will now be had to the drawing, wherein Figure 1 is a plan of the front axle assembly of an automobile showing the device in position, and Fig. 2 is a side elevation of the device.

In the drawing, 1 denotes a front axle having radius rods 2 terminating in a ball 3. 4 denotes spindle arms connected by a steering spindle connecting rod 5 and connected to this rod is a steering gear connecting rod 6. These parts are of the ordinary and well known type common to a "Ford" automobile and my device is installed between the rods 5 and 6 and the ball 3 of the radius rods 2.

The device comprises an equalizing member 7 and loosely connected thereto are links 8 and 9 engaging the rods 5 and 6 respectively.

Connected to the equalizing member 7 is a coiled retractile spring 10, and said spring is connected by a link 11 to the ball 3 of the radius rods. The link 11 has an eye 12 which permits of the link being easily placed over the ball 3 and this link, as well as the links 8 and 9, is constructed of rigid wire.

When the device is installed the spring 10 is expanded and placed under tension and it is the retractile force of said spring that pulls the connecting rods 5 and 6 taut or firm against the connections thereof, thus preventing rattling or noise due to loose fitting or lost motion.

One embodiment of my invention has been illustrated, but it is to be understood that the structural elements are susceptible to such variations and modifications as fall within the scope of the appended claims.

What I claim is:—

1. A device of the type described comprising an equalizing member, a spring attached thereto, a link connected to said spring and adapted to be connected to the radius rods of an automobile, and means connected to said member adapted for coupling said spring to the steering gear and spindle rods of an automobile.

2. A device of the type described comprising links adapted for engagement with the steering and spindle connecting rods of an automobile, an equalizing member connected to said links, a retractile spring connected to said equalizing member, and a link connected to said spring and adapted for engagement with the radius rods of an automobile to hold said spring under tension so that the retractile force thereof takes up lost motion of said connecting rods.

In testimony whereof I affix my signature in the presence of two witnesses.

FREDERICK S. EKLIFF.

Witnesses:
 KARL H. BUTLER,
 ANNA M. DORR.

Copies of this patent may be obtained for five cents each, by addressing the "Commissioner of Patents, Washington, D. C."